United States Patent [19]
Bell et al.

[11] Patent Number: 4,903,129
[45] Date of Patent: Feb. 20, 1990

[54] AUDIO SIGNAL SECTION APPARATUS

[75] Inventors: Issac M. Bell; Gene K. Sendelweck, both of Indianapolis, Ind.

[73] Assignee: Thomson Consumer Electronics, Inc., Indianapolis, Ind.

[21] Appl. No.: 334,058

[22] Filed: Apr. 6, 1989

[51] Int. Cl.[4] .................. H04N 5/268; H04N 5/60; H04N 5/74; H04N 5/272

[52] U.S. Cl. ................................. 358/181; 358/183; 358/198; 358/22

[58] Field of Search ............ 358/181, 182, 183, 194.1, 358/198, 143, 86

[56] References Cited

U.S. PATENT DOCUMENTS

| | | | |
|---|---|---|---|
| 3,629,844 | 12/1971 | Dancis et al. | 358/143 |
| 4,581,645 | 4/1986 | Beyers, Jr. | 358/181 |
| 4,729,027 | 3/1988 | Hakamada et al. | 358/183 |
| 4,746,983 | 5/1988 | Hakamada et al. | 358/183 |
| 4,774,582 | 9/1988 | Hakamada et al. | 358/183 |
| 4,777,531 | 10/1988 | Hakamada et al. | 358/183 |
| 4,821,101 | 4/1989 | Short | 358/143 |
| 4,845,564 | 7/1989 | Hakamada et al. | 358/181 |

OTHER PUBLICATIONS

Service Manual Sony SLV-50/70HF, (TV, Line In 1, Line In 2).
Service Manual Sony SLV-70AF (pp. 22,86 and 150).
RCA Color Television Basic Service Data, 1987, CTC-140, (pp. 2-10).

Primary Examiner—John K. Peng
Attorney, Agent, or Firm—Joseph S. Tripoli; Peter M. Emanuel; Thomas F. Lenihan

[57] ABSTRACT

A television receiver having picture-in-picture capability and having multiple electronically selectable auxiliary baseband signal inputs provides automatic selection of the proper audio signal by use of bilevel digital switching circuitry.

9 Claims, 4 Drawing Sheets

AUDIO SIGNAL SECTION APPARATUS

FIELD OF THE INVENTION

This invention relates to the field of television receivers having picture-in-picture capability.

BACKGROUND OF THE INVENTION

The term "television receiver" as used herein means a device for receiving and processing television signals, and thus includes television receivers having a display system (commonly referred to as television sets) and also devices without a display system such as videocassette recorders.

The term "television monitor/receiver" as used herein means a television receiver having an RF tuner and baseband signal input circuitry.

Many modern television receivers include picture-in-picture (also known as "pix-in-pix", or "PIP") capability. In a PIP system, video signals from two different sources may be combined to form a single image for display on a display screen wherein the combined image comprises a main picture, and an inset smaller picture usually located near one of the corners of the display screen.

For example, Sony videocassette recorder (VCR) SLV-70F has PIP capability wherein one signal source must be a videotape in playback mode, and the other signal source is selected from a group consisting of a built-in television tuner and two external sources of video. In the above-noted Sony system, the audio signal selected for reproduction is the audio signal associated with the picture displayed in the main viewing area. If the displayed positions of the video image signals from the two sources are interchanged (i.e. "swapped"), then the audio signal source associated with the video currently displayed as the main picture is automatically selected.

The Sony system employs a three-input audio selector switch having a single control input line. Unfortunately, this requires a trilevel switching signal (i.e., including low, half-high, and high levels) to be developed in order to select the proper audio source. The trilevel switching system undesirably requires both a more complex encoder and a more complex decoder, and fails to take advantage of the noise immunity inherent in bilevel digital switching circuitry.

A television monitor/receiver having multiple electronically selectable auxiliary baseband signal inputs is known from the RCA CTC-140 manufactured by Thomson Consumer Electronics, Indianapolis, IN. This monitor/receiver employs bilevel digital switching logic to automatically provide the proper audio when each of the video source selections is made (i.e. tuner, AUX1, or AUX2), rather than using a more complex trilevel switching arrangement. However, this monitor/receiver does not have PIP capability.

SUMMARY OF THE INVENTION

A television receiver includes a multiple input video switch and a multiple input audio switch. Each switch has a pair of switching control inputs, with respective pairs coupled together and driven by a system controller. Another controller substitutes alternate control signals for the control signals normally applied to the control inputs of the audio switch in response to a third control signal generated by the system controller.

DETAILED DESCRIPTION OF THE EMBODIMENT

Figure 1:
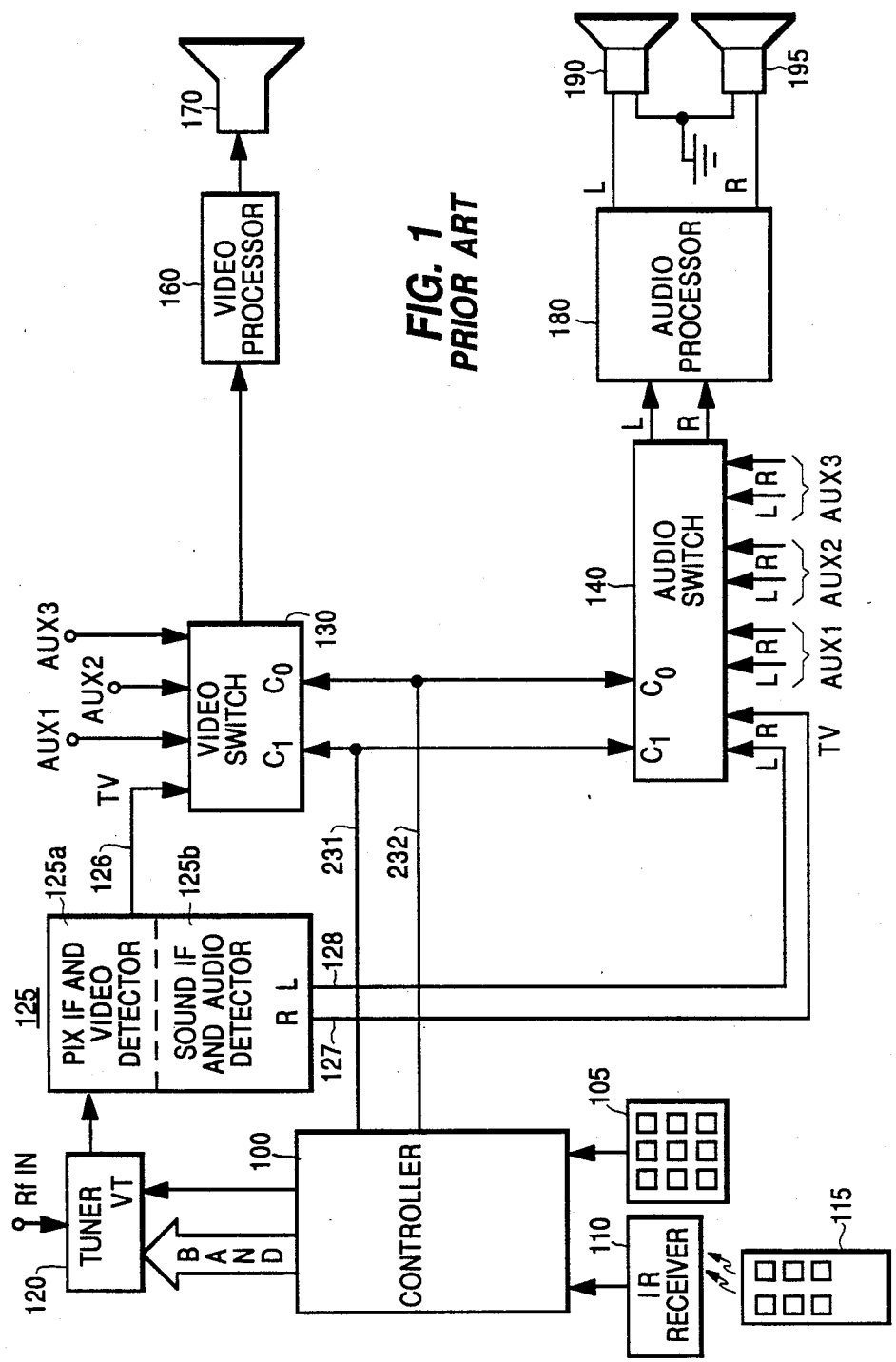
FIG. 1 illustrates, in block diagram form, a switching system of the prior art.

Referring to prior art FIG. 1, a controller 100 receives user-entered control signals from a local keyboard 105 and from an infrared (IR) receiver 110. IR receiver 110 receives and decodes remote control signals transmitted by a remote control unit 115. Controller 100, which may be a microprocessor or microcomputer, causes a television tuner 120 to select a particular RF signal to be tuned in response to data entered by a user. Tuner 120 produces a signal at an intermediate frequency (IF) and applies it to a processing unit 125 comprising a first section 125a including a picture (PIX) amplifying stage and video detector, and a second section 125b including, a sound amplifying stage, an audio detector and a stereo decoder. Processing unit 125 produces a baseband video signal (TV), and baseband left and right audio signals.

The baseband video signal (TV) is coupled via line 126 to one input of a four input video switch 130. The baseband left and right audio signals are applied to one pair of inputs of an audio switch 140 capable of selecting a pair of inputs from four pairs of audio inputs. Video switch 130 and audio switch 140 each have three other inputs labelled AUX1, AUX2 and AUX3, for receiving respective baseband video and audio signals from external sources. Each of the inputs of video switch 130 and audio switch 140 is selectable in response to binary signals generated by controller 100 and applied to control inputs $C_1$ and $C_0$ via conductors 231 and 232, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding video and audio signals is ensured because the control lines 231 and 232 are coupled to respective control inputs $C_1$ and $C_0$ of both video switch 130 and audio switch 140.

The selected video signal is applied to a video processor unit 160 and ultimately displayed on a display screen of a display device 170. The selected audio signals are applied to an audio processor unit 180 and ultimately reproduced via speakers 190, 195. The above-described circuitry is essentially known from the RCA CTC-140 television receiver manufactured by Thomson Consumer Electronics, Indianapolis, Ind.

A preferred embodiment of the subject invention will now be described with respect to FIGS. 2a, 2b, 3a and 3b. Similarly numbered elements in FIGS. 2a and 2b accomplish the same functions as their counterparts in FIG. 1, and therefore these functions need not be described again.

Figure 2A:
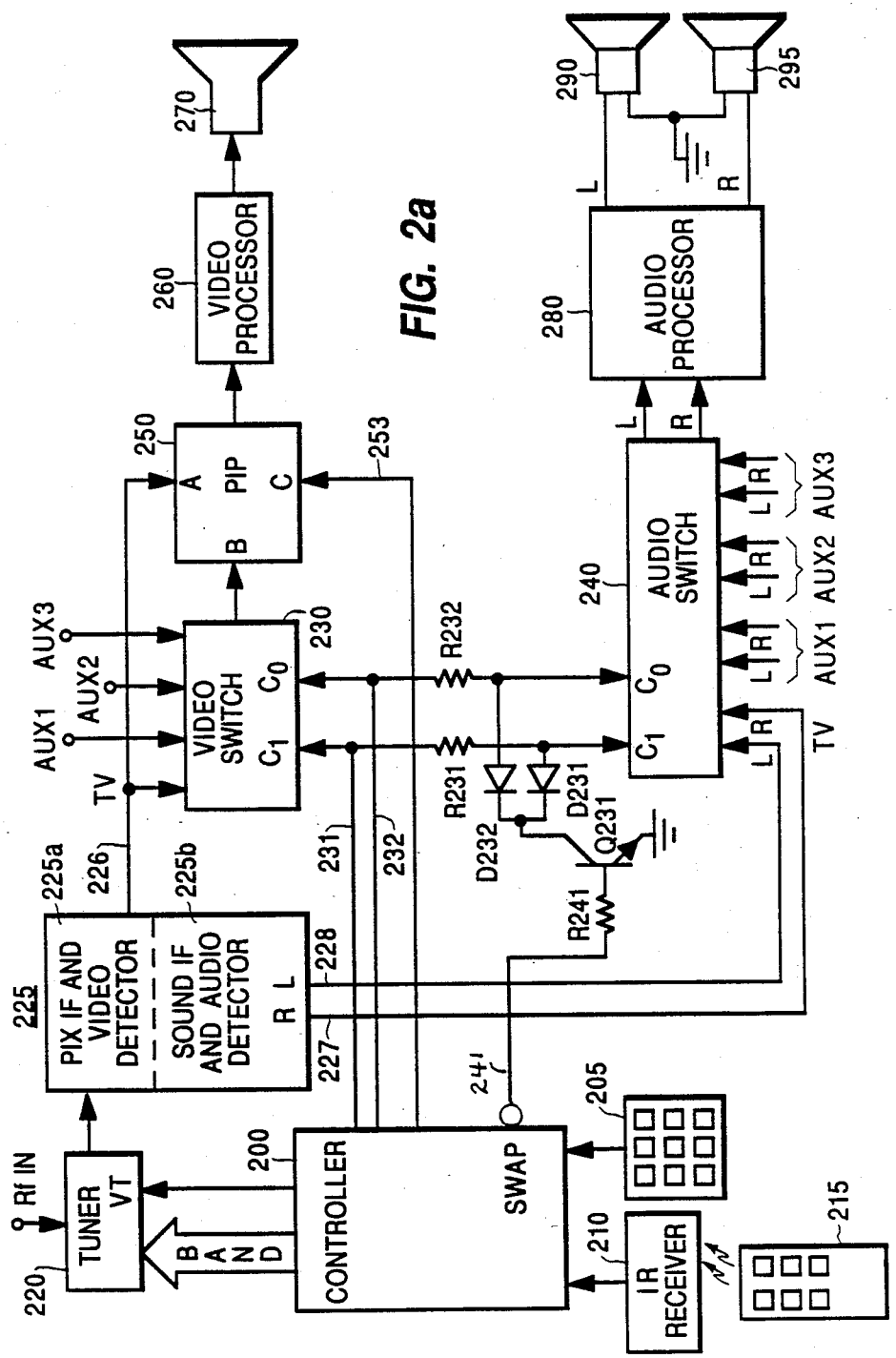
FIGS. 2a and 2b illustrate partially in block diagram form and partially in schematic form, embodiments of the invention.

Referring to FIG. 2a, a picture-in-picture (PIP) unit 250 is shown inserted between video switch 230 and video processor 260. The A signal input of PIP unit 250 is connected to receive baseband signals from the built-in tuner/IF circuitry of the television receiver, and the B signal input is connected to receive the output signal of video switch 230. PIP unit 250 has a control input C to which a serial control bus 253 is coupled. Serial control bus 253 couples command data from controller 200 which controls PIP unit 250 to produce an image for display, as shown, for example, in prior art FIG. 3a. The display of FIG. 3a has a main (or primary) picture 310, and an inset (or secondary) picture 320. Under controller command, via serial bus 253, the PIP function may be enabled and disabled, and the inset picture may be displayed, for example, in each of the four corners, or in several other areas. Also under controller command via serial bus 253, PIP unit 250 may be controlled to interchange (swap) the main and inset television images displayed in positions 310 and 320, as shown in prior art FIG. 3b. The sound reproduced by speakers 290, 295 desirably "follows" (i.e., is the sound associated with) the image displayed as the main picture 310.

Figure 2B:
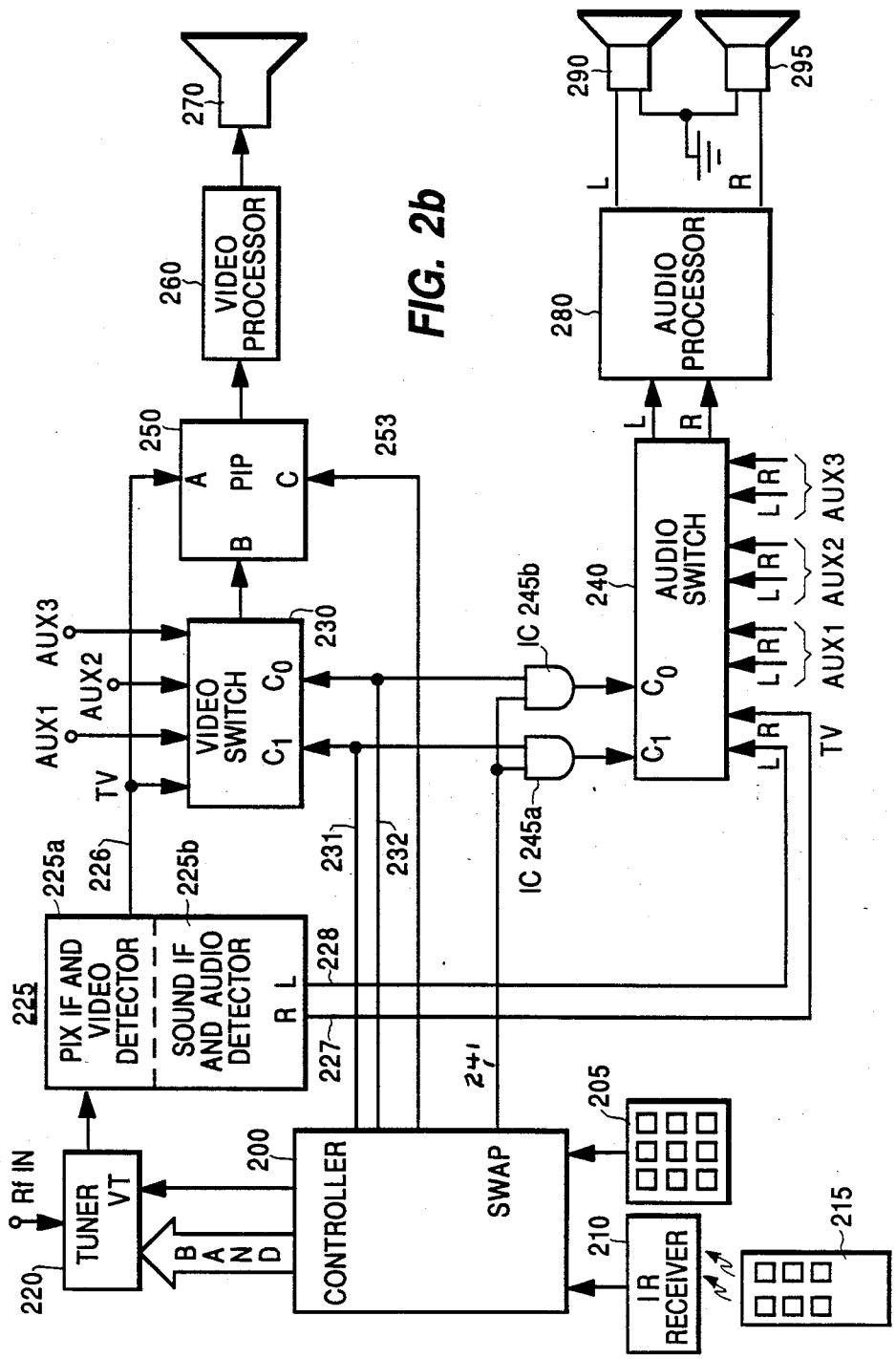
Figure 3A:
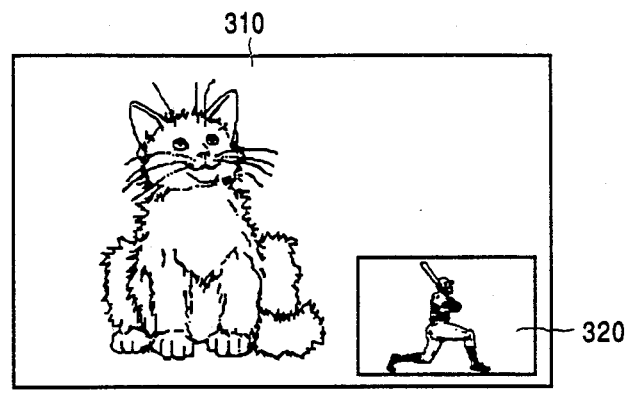
FIGS. 3a and 3b display screens known from the prior art but useful for explaining the environment in which the illustrated embodiment of the invention is set.
Figure 3B:
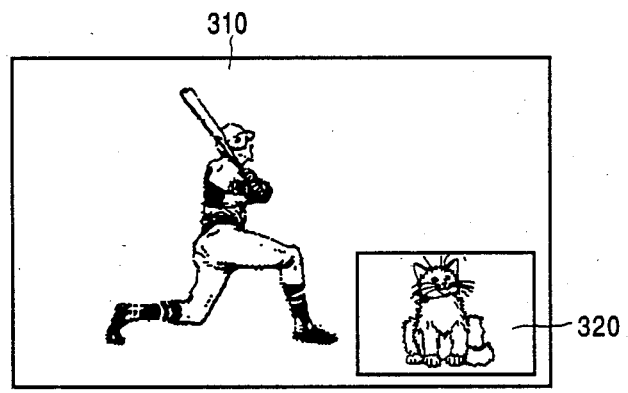

Note, however, that the audio switching arrangement of FIG. 1 is not particular well suited for use in a PIP system in which the PIP unit 250 is inserted between video switch 130 and video processor 160 as shown in FIGS. 2a and 2b. In this configuration, audio signal selection should be based upon the video signal selection provided by video signal switch 230 only when the video signal at the output of switch 230 is directed to the main picture display area.

The structure of FIGS. 2a and 2b provide for selection of an audio signal in response to control signals applied to parallel-connected control inputs $C_1$ and $C_0$ of video signal switch 230 and audio signal switch 240, and also in response to a signal indicative of whether the main and inset pictures are swapped.

Specifically, this is accomplished by the addition of resistors R231, R232, diodes D231, D232, transistor Q231, and a SWAP control line 241. Resistors R231 and R232 are inserted in series between respective control inputs $C_1$ and $C_0$ of video switch 230, and respective control inputs $C_1$ and $C_0$ of audio switch 240, with control signal lines 231 and 232 directly connected to the control inputs $C_1$ and $C_0$ of video switch 250, as shown in FIG. 2. The anode of diode D231 is coupled to the junction of control input $C_1$ of audio switch 240 and resistor R231. The anode of diode D232 is coupled to the junction of control input $C_0$ of audio switch 240 and resistor R232. The cathodes of diodes D231 and D232 are connected together and to the collector of switching transistor Q231. The emitter of transistor Q231 is connected to ground, and its base is connected to the SWAP terminal of controller 200 through a current limiting resistor R241. The "bubble" shown at the "SWAP" terminal of controller 200 of FIG. 2a indicates that the SWAP control signal produced at that output terminal is inverted with respect to its normal logical state. That is, the SWAP control signal applied to control line 241 exhibits a high logical state when the video images are not swapped. The operation of this circuitry will now be explained.

The A input of PIP unit 250, as noted above, is directly connected to receive TV video signals from the built-in tuner/IF circuitry. So long as the video signals at the A input are directed to the main picture area and the video signals at input B are directed to the inset (secondary) display position, the TV sound signals derived from the built-in tuner/IF circuitry should be selected. In this condition, the control signal applied to control line 241 is at a high level, and the A and B input signals of PIP unit 250 are not swapped. A high level signal on control line 241 causes transistor D231 to conduct through diodes D231 and D232 and resistors R231 and R232, respectively, and thereby causes the code 00 to appear at control inputs $C_1$ and $C_0$ of audio switch 240, regardless of the signal levels on video select lines 231 and 232. As noted above, the binary code impressed on control inputs $C_1$ and $C_0$, for selecting TV audio, is 00. Therefore, so long as a swap command is not issued to PIP unit 250 via serial bus 253, controller 200 maintains a high logic level on control line 241. Thus, the user may enter commands via keyboard 205, or IR remote control unit 215, which cause the image displayed in the inset (secondary) picture area to be drawn from the AUX1, AUX2, AUX3, or TV input, without affecting the selection of audio.

When a user enters a SWAP command, controller 200, in turn, issues a SWAP command to PIP unit 250 via serial bus 253. This causes the signal at the output of video switch 230 (i.e. at the B input of the PIP unit) to be displayed in the main picture area, and the signal at the A input to be displayed in the inset picture area. In addition, controller 200 changes the state of the control signal on control line 241 to the low signal level. This causes transistor 231 to stop conducting, and allows control inputs $C_1$ and $C_0$ of audio switch 240 to be controlled via control lines 231 and 232. In this way, the audio associated with the video signal selected by video switch 230 will be automatically selected for reproduction when the video signal selected by video switch 230 is displayed in the main picture area.

Referring to FIG. 2b, resistor 241, transistor Q231, diodes D231 and D232, and resistors R231 and R232 collectively have been replaced by a pair of two-input AND gates IC 245a and IC 245b. Control line 231 is coupled to one input of IC 245a and control line 232 is coupled to one input of IC 245b. The other inputs of the AND gates are coupled together and to a terminal labelled SWAP on controller 200, for receiving a control signal which indicates that the main and inset pictures are swapped. The signal developed at the SWAP terminal of controller 200 is at a high level only when the video signals are swapped. In this case, the SWAP control signal polarity is reversed with respect to FIG. 2a. Thus, when the video signals at the A and B inputs of PIP unit 250 are not swapped, the signals developed at the outputs of IC 245a and IC 245b are "forced" to a low level and substituted at control inputs $C_1$ and $C_0$ of audio switch 240, in place of the control signals normally applied from control lines 231 and 232. However, when the video signals are swapped the control signals on control lines 231 and 232 are passed through AND gates IC 245a and 245b. Thus, the audio signal, as selected in FIG. 2b, also follows the video, displayed as the main picture.

The arrangements of FIGS. 2a and 2b also advantageously allow the same circuit board to be used in top-of-the-line receivers having PIP capability, and in more economical receivers which do not include PIP capability. With regard to the circuitry of FIG. 2a, this is easily accomplished during manufacturing by leaving out diodes D231, D232, transistor D231, and resistor R240, and by replacing PIP unit 250 with a jumper wire from its B input to its output, and replacing resistors R231 and R232 with jumper wires. With regard to the circuitry of FIG. 2b, this is easily accomplished by replacing AND gates 245a and 245b with jumper wires from their respective $C_1$ and $C_0$ inputs to their respective outputs and by replacing PIP unit 250 with a jumper wire as described above. This dual use of the circuit board saves time, effort, and expense which would otherwise be expended in manufacturing an additional circuit board, and stocking it in inventory, and also permits the use of the same switching circuitry and controller, resulting in an even greater cost saving (an extremely important consideration in today's highly competitive consumer electronics market).

What is claimed:

1. A baseband television signal switching system, comprising:
   video switch means, having a plurality of video signal inputs for receiving respective baseband video signals, having first and second control inputs for receiving respective first and second switching control signals and having an output terminal for developing a video signal selected from said baseband video signals at said plurality of video inputs in response to said switching control signals;
   audio switch means, having a plurality of signal inputs for receiving respective baseband audio signals, having first and second control inputs for receiving said respective first and second control switching signals and having an output terminal for developing an audio signal selected from said baseband video signals at said plurality of audio inputs in response to said switching control signals;
   control means for generating said first and second switching control signals at first and second outputs respectively, and generating a third control signal at a third output in response to data signals input by a user; and
   additional control means coupled to said control means for substituting an alternate control signal for said first and second control signals at said control inputs of said audio switch means in response to said third control signal.

2. The switching system of claim 1 wherein said alternate control means comprises:
   first resistance means coupled in series between said first control input of said video switch means and said first control input of said audio switch means; and
   second resistance means coupled in series between said second control input of said video switch means and said second control input of said audio switch means;
   said first control signal being coupled to the junction of said first control input of said video switch means and said first resistance means, and said second control signal being coupled to the junction of said second control input of said video switch means and said second resistance means.

3. The switching system of claim 2 wherein said alternate control means also comprises:
   first diode means having a first end coupled to the function of said first resistance means and said first control input of said audio switch means, and a second end coupled to receive said third control signal; and
   second diode means having a first end coupled to the junction of said second resistance means and said second control input of said audio switch means, and a second end coupled to receive said third control signal.

4. The switching system of claim 1 wherein said alternate control means comprises an AND gate.

5. A television receiver having picture-in-picture capability, comprising:
   an RF signal input for receiving a plurality of television RF signals;
   television tuner means for selecting a particular RF signal from said plurality of signals in response to a tuner control signal, and producing an IF signal from said selected RF signal;
   IF processing and detector means coupled to said tuner means for receiving said IF signal and producing a detected baseband video signal and a detected baseband audio signal therefrom:
   control means coupled to said tuner means for generating said tuner control signal and first, second and third selection control signals in response to data signals;
   data input means coupled to said control means for generating said data signals in response to activation by a user;
   a first auxiliary baseband video signal input terminal for receiving a first auxiliary baseband video signal;
   a second auxiliary baseband video signal input terminal for receiving a second auxiliary baseband video signal;
   a first auxiliary baseband audio signal input terminal for receiving a first auxiliary baseband audio signal;
   a second auxiliary baseband audio signal input terminal for receiving a second auxiliary baseband audio signal;
   video signal switch means having first and second signal inputs coupled to said first and second auxiliary baseband video signal input terminals respectively, for receiving said first and second auxiliary baseband video signals, having a third input coupled to said detector means for receiving said detected baseband video signal, having first and second control inputs for receiving said first and second selection control signals, and having an output terminal for developing a video signal selected from said video signals at said inputs in response to said selection control signals;
   audio switch means having first and second input terminals coupled to said first and second auxiliary baseband audio signal input terminals for receiving said first and second auxiliary baseband audio signals, having a third input coupled to said detector means for receiving said detected baseband audio signal, having first and second control inputs for receiving first and second control inputs for receiving first and second selection control signals, and having an output terminal for developing a signal selected from said audio signals at said inputs in response to said selection control signals;
   picture-in-picture processing means for receiving first and second image signals and combining said signals to form a combined image signal, having a first signal input coupled to said video detector means for receiving said detected baseband video signal and a second signal input coupled to said output terminal of said video switch means for receiving said selected video signal, having a control input for receiving a control signal, and having an output terminal for developing said combined image signal in response to said control signal; and
   alternate control means coupled to said control means for substituting an alternate control signal for said first and second control signals at said control inputs of said audio switch means in response to said third control signal.

6. The television receiver of claim 5 wherein when said control means causes said picture-in-picture means to interchange the displaced positions of its first and second image signals, said control means changes the logical state of said third control signal.

7. The television receiver of claim 6 wherein said alternate control means comprises:
    first resistance means coupled in series between said first control input of said video switch means and said first control input of said audio switch means; and
    second resistance means coupled in series between said second control input of said video switch means and said second control input of said audio switch means;
    said first control signal being coupled to the junction of said first control input of said video switch means and said first resistance means, and said second control signal being coupled to the junction of said second control input of said video switch means and said second resistance means.

8. The television receiver of claim 7 wherein said alternate control means also comprises
    first diode means having a first end coupled to the junction of said first resistance means and said first control input of said audio switch means, and a second end coupled to receive said third control signal; and
    second diode means having a first end coupled to the junction of said second resistance means and said second control input of said audio switch means, and a second end coupled to receive said third control signal.

9. The television receiver of claim 6 wherein said alternate control means comprises an AND gate.

* * * * *

UNITED STATES PATENT AND TRADEMARK OFFICE
CERTIFICATE OF CORRECTION

PATENT NO. : 4,903,129

DATED : February 20, 1990

INVENTOR(S) : Isaac Michael Bell, et al.

It is certified that error appears in the above-identified patent and that said Letters Patent is hereby corrected as shown below:

Column 5, line 60 (Claim 3): that portion reading "function" should read -- junction --.

Signed and Sealed this

Fourth Day of December, 1990

Attest:

*Attesting Officer*

HARRY F. MANBECK, JR.

*Commissioner of Patents and Trademarks*